(12) United States Patent
Agombar et al.

(10) Patent No.: US 11,106,397 B2
(45) Date of Patent: *Aug. 31, 2021

(54) THIN PROVISIONING OF RAID STORAGE (71) Applicant: International Business Machines Corporation, Armonk, NY (US)

(72) Inventors: John P. Agombar, Winchester (GB); Ian Boden, Southampton (GB); Gordon D. Hutchison, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/569,592

(22) Filed: Sep. 12, 2019

(65) Prior Publication Data

US 2020/0004466 A1 Jan. 2, 2020

Related U.S. Application Data

(63) Continuation of application No. 15/412,898, filed on Jan. 23, 2017, now Pat. No. 10,459,663.

(51) Int. Cl.
*G06F 3/06* (2006.01)
*G06F 11/10* (2006.01)

(52) U.S. Cl.
CPC .......... *G06F 3/0665* (2013.01); *G06F 3/0614* (2013.01); *G06F 3/0689* (2013.01); *G06F 11/1076* (2013.01)

(58) Field of Classification Search
CPC .... G06F 3/0665; G06F 3/0614; G06F 3/0689; G06F 2211/1004; G06F 2211/1028; G06F 2211/103; G06F 2211/1083; G06F 2212/262; G06F 2212/152
See application file for complete search history.

(56) References Cited

U.S. PATENT DOCUMENTS

| 7,949,847 B2 | 5/2011 | Murase |
| 7,991,969 B1 | 8/2011 | Chatterjee et al. |
| 9,146,695 B2 | 9/2015 | Galloway et al. |
| 2004/0230766 A1 | 11/2004 | Cameron |

(Continued)

FOREIGN PATENT DOCUMENTS

CN 103838524 A 4/2014

OTHER PUBLICATIONS

Feresten et al. "Back to Basics: Netapp Thin Provisioning", NetApp, 5 pages, available at: http://www.netapp.com/us/communities/tech-ontap/tot-btb-thin-provisioning-1010-hk.aspx, last accessed Jan. 17, 2017.

*Primary Examiner* — Tracy A Warren
(74) *Attorney, Agent, or Firm* — Kunzler Bean & Adamson (57) ABSTRACT

The various embodiments relate to a storage system, storage system method and computer program product including: providing a distributed collection of drives, each drive having logical blocks, each logical block being assignable to a segment with an associated volume and being configurable to RAID characteristics associated with that volume; assigning a first group of logical blocks to a segment with an associated volume and configuring the first group of logical blocks to RAID characteristics associated with that volume; and wherein a further group of logical blocks is ready to be assigned to any segment but is not yet assigned.

20 Claims, 9 Drawing Sheets

(56) References Cited

U.S. PATENT DOCUMENTS

| | | | |
|---|---|---|---|
| 2012/0011315 A1* | 1/2012 | Ishizaki | G06F 3/0665 |
| | | | 711/114 |
| 2015/0269000 A1 | 9/2015 | Alexeev et al. | |
| 2015/0347435 A1 | 12/2015 | Pavlov et al. | |
| 2016/0077764 A1 | 3/2016 | Ori | |
| 2016/0188211 A1 | 6/2016 | Song et al. | |

* cited by examiner

FIGURE 1

Thin Provisioning RAID Controller 220

Drive Controller 222

Segment Controller 224

Volume RAID Controller 226

Data Rebuilder 228

Thin Provisioning RAID Method 300

Figure 2A

Indirection Table 240

Logical Block Address Segment Mapping 242

Data Block Segment Block Mapping 244

Segment Start Segment Block Mapping 246

RAID address Segment Offset Mapping 248

Figure 2B

Segment Controller 224

RAID Identifier 224.2

Storage Determiner 224.4

Block Determiner 224.6

Block Remover 224.8

Segment Engine 224.10

Figure 2C

Data Rebuilder 228

- Failure Identifier 228.2
- RAID Retriever 228.4
- Block Locator 228.6
- Redundancy Locator 228.8
- Rebuilding Engine 228.10

310 Rebuilding lost data on spare logical blocks

370 Start when drive fails

372 Identify one or more segments and failed logical blocks associated with a failed drive 374 Retrieve RAID characteristics of the identified segment/s 376 Locate spare logical blocks on identified segment/s 378 Locate redundant RAID data corresponding to lost data on the failed logical blocks using retrieved RAID characteristics 380 Rebuild lost data on spare logical blocks from located redundant RAID data 382 End

THIN PROVISIONING OF RAID STORAGE

REFERENCE TO RELATED APPLICATION

The present application is a continuation of and claims priority to U.S. patent application Ser. No. 15/412,898 filed on Jan. 23, 2017, the contents of which are incorporated herein by reference in their entirety.

BACKGROUND

The present technology relates to a method and apparatus for thin provisioning of RAID storage.

Thin provisioning of a storage system is known, typically there is a storage pool with a fixed real size that contains a volume that is presented to a host system. The volume has a virtual size and takes more of the pool's capacity as more data is written to the volume. The volume comprises storage capacity from one logical unit number (LUN) or from many LUNs. LUNs can be one or more RAID arrays having different RAID profiles. If the volume has many LUNs with different redundancies, then the volume's redundancy is that of the weakest redundancy RAID profile in use. If the volume is constrained to LUNs with a specific redundancy, then the volume cannot increase in size to use more pool storage capacity. Only a small number of drives are able to contribute to rebuilding data for the failed drive when several small RAID arrays are used.

SUMMARY

In an aspect of the technology there is provided a storage system comprising: a collection of drives, each drive having logical blocks, each logical block being assignable to a segment with an associated volume and being configurable to RAID characteristics associated with that volume; a group of logical blocks assigned to a segment with an associated volume and wherein the logical blocks are configured to RAID characteristics associated with that volume; and a further group of logical blocks not yet being assigned to a segment.

In another aspect of the technology there is provided a storage system comprising: a drive controller for providing a collection of drives, each drive having logical blocks; a segment controller for assigning a first group of logical blocks to a first segment with an associated volume and for assigning a further group of logical blocks to a further segment with an associated volume; and a volume RAID controller for configuring groups of logical blocks assigned to segments to RAID characteristics of respective associated volumes.

In a further aspect of the technology there is provided a storage system method comprising: providing a collection of drives, each drive having logical blocks, each logical block being assignable to a segment with an associated volume and being configurable to RAID characteristics associated with that volume; assigning a first group of logical blocks to a segment with an associated volume and configuring the first group of logical blocks to RAID characteristics associated with that volume; and wherein a further group of logical blocks is ready to be assigned to an segment but is not yet assigned.

Logical blocks can be configured to RAID characteristics including one or more of: stripe width; stripe length (also known as stripe length or block size); parity segments; mirror segments and spare segments.

The embodiments grow the proportion of space within individual disk drives allocated to each RAID configuration based on the growth of user level datasets that have configured redundancy requirement. As drives get bigger and multi-use becomes more common than the need for configurable proportions of space increases. Instead of a pool consisting of lots of LUNs with different RAID profiles, a pool consists of a single large LUN using a distributed RAID profile, it then has virtual thin provisioned LUNs that have different RAID profiles, when a volume wants to expand, it takes capacity from the virtual LUN that has the correct RAID profile that has been associated with the volume, the virtual LUN takes the capacity from the single large LUN. This top down approach means that a required level of redundancy a volume can be provided without having to arbitrarily partition up the capacity of the pool.

In yet another aspect of the technology there is provided a computer program stored on a computer readable medium and loadable into the internal memory of a digital computer, comprising software code portions, when said program is run on a computer, for performing the following blocks: providing a collection of drives, each drive having logical blocks, each logical block being assignable to a segment with an associated volume and being configurable to RAID characteristics associated with that volume; assigning a first group of logical blocks to a segment with an associated volume and configuring the first group of logical blocks to RAID characteristics associated with that volume; and wherein a further group of logical blocks is ready to be assigned to a segment but is not yet assigned.

BRIEF DESCRIPTION OF THE DRAWINGS

Preferred embodiments of the present technology will now be described, by way of example only, with reference to the following drawings in which.

DETAILED DESCRIPTION

Figure 1:
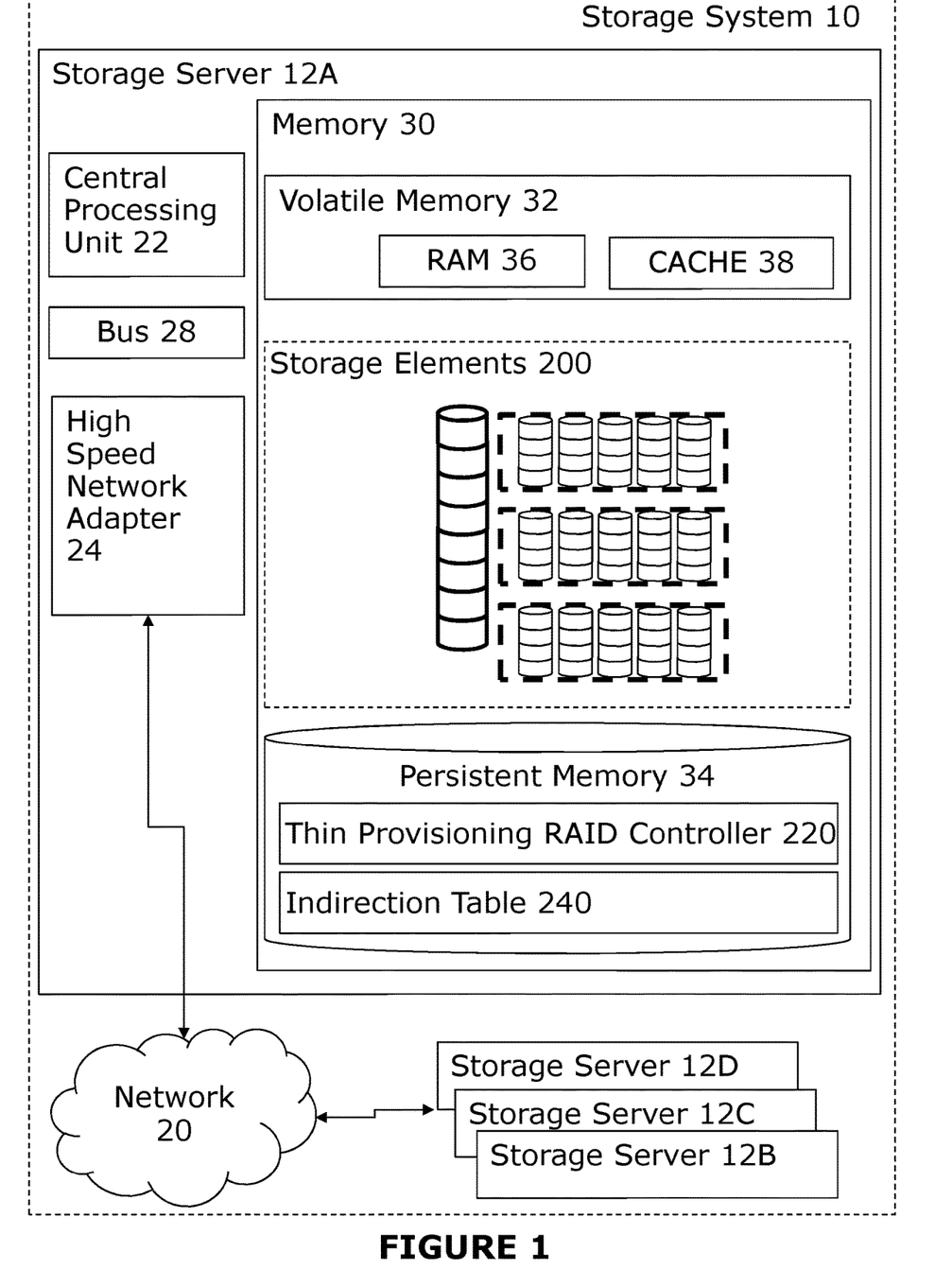
FIG. 1 is a deployment diagram of the preferred embodiment.

Referring to FIG. 1, the deployment of a preferred embodiment in storage system 10 is described. Storage system 10 is operational with numerous other general purpose or special purpose computing system environments or configurations. Examples of computing system environments or configurations that may be suitable for use with storage system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices.

Storage system 10 may be described in the general context of a computer system comprising storage elements and that can execute instructions for controlling the input, output and configuration of the storage elements. Program modules containing instructions are executed by a computer processor. Generally, program modules may include: routines; programs; objects; components; logic; and data structures that perform particular tasks or implement particular abstract data types. Storage system 10 may be embodied in a distributed storage environment where tasks are performed by remote processing devices that are linked through a communications network. In a distributed storage environment, program modules may be located in both local and remote computer system storage media including memory storage devices.

Storage system 10 comprises: one or more storage servers 12A to 12D connected over a network 20. Storage server 12A comprises: central processing unit (CPU) 22; high speed network adapter 24; bus 28 and memory 30.

CPU 22 loads instructions from memory 30 and performs operations in response to the instructions. Such operations include: incrementing or decrementing a value in a register; transferring a value from memory 30 to a register or vice versa; reading or writing a value to or from storage elements 200; branching to a different location in memory if a condition is true or false (also known as a conditional branch instruction); and adding or subtracting the values in two different registers and loading the result in another register. A typical CPU can perform many different machine operations. A set of machine instructions is called a machine code program; the machine instructions are written in a machine code language which is referred to as a low level language. A computer program is typically written in a high level language that needs to be compiled to or interpreted as a machine code program before it can be run.

High speed network adapter 24 is for enabling high speed communication between the storage servers and network devices (not shown).

Bus 28 couples the main system components together including memory 30 to CPU 22.

Memory 30 includes computer system readable media in the form of volatile memory 32; non-volatile or persistent memory 34; and storage elements 200. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Storage elements 200 comprise disk drives arranged into an array.

Machine instructions configured to carry out the functions of the preferred embodiment comprise: thin provisioning RAID controller 220 and indirection table 240. In the preferred embodiment, the instruction modules are loaded from the persistent memory 34, where it is stored, into volatile memory 32 for operation. In another embodiment, ROM in memory 30 stores the instruction modules for enabling the storage server 12A to function as a special purpose computer specific to the module 200. Further program modules that support the preferred embodiment but are not shown include firmware, boot strap program, operating system, and support applications. Each of the operating system; support applications; other program modules; and program data; or some combination thereof may include an implementation of a networking environment.

Figure 2A:
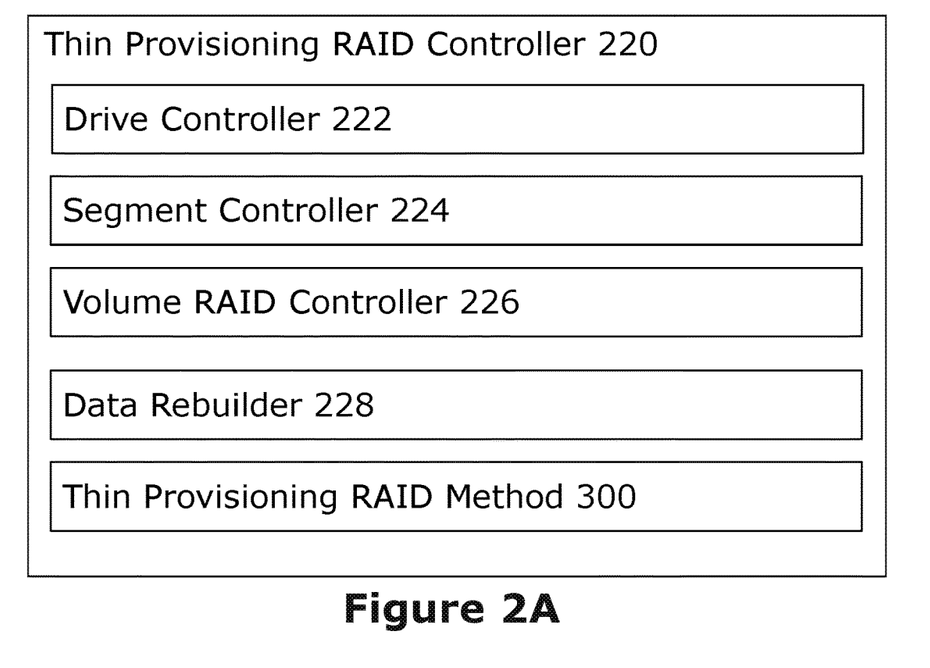
FIG. 2A is a component diagram of a thin provisioning RAID controller of the preferred embodiment.

Referring to FIG. 2A, thin provisioning RAID controller 220 comprises: drive controller 222; segment controller 224; volume RAID controller 226; data rebuilder 228; and thin provisioning RAID method 300.

Drive controller 222 is for providing a distributed collection of drives wherein each drive is divided into logical blocks of addressable storage.

Segment controller 224 is for assigning one or more groups of logical blocks to respective one or more segments and for associating one or more segments with one or more volumes. A volume associated with second or further segment can be an existing volume or a new volume.

Volume RAID controller 226 is for configuring segments of logical blocks to RAID characteristics of respective volumes associated with the segments.

Data rebuilder 228 is for: identifying one or more failed segments with failed logical blocks associated with a failed drive; retrieving RAID characteristics of the identified segments; locating spare logical blocks on the identified segments; locating redundant RAID data corresponding to lost data on the failed logical blocks using retrieved RAID characteristics; and rebuilding lost data on the spare logical blocks from the redundant RAID data. RAID characteristics include one or more of: stripe width; stripe length (also known as stripe length, block size); parity characteristics; mirror characteristics and spare count.

Thin provisioning RAID method 300 is for controlling the components of the thin provisioning RAID controller 220 and is described in more detail below.

Figure 2B:
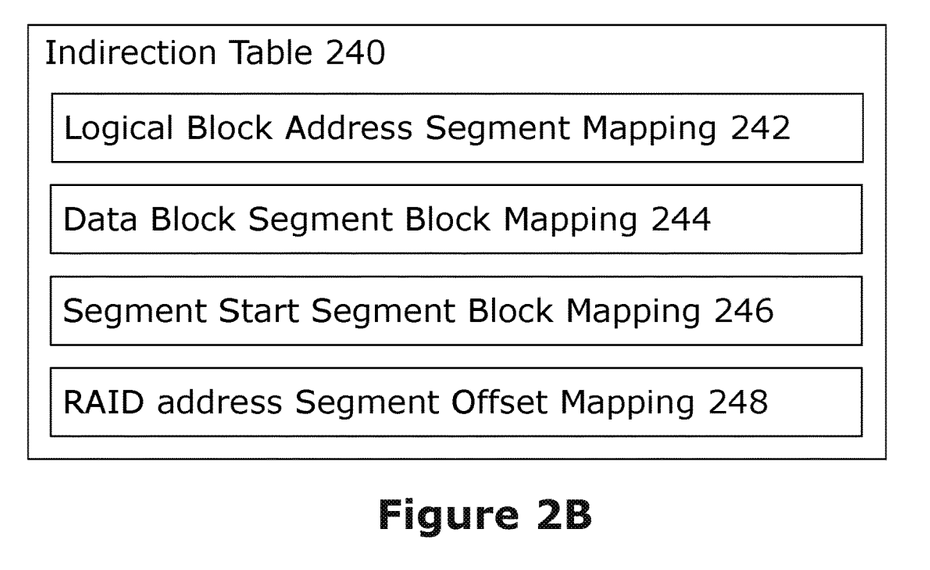
FIG. 2B is a component diagram of an indirection table of the preferred embodiment.

Referring to FIG. 2B, indirection table 240 comprises: logical block address segment mapping 242; data block segment block mapping 244; segment start segment block mapping 246; and RAID address segment offset mapping 248. Data storage input and output occurs through indirection table 240.

Logical block address segment mapping 242 is for mapping a logical block address to a segment number and data block offset within that segment.

Data block segment block mapping 244 is for mapping a data block offset within the segment to a segment physical block offset within a segment using standard 9 functions for that particular raid level and ration of distributed spare space.

Segment start segment block mapping 246 is for mapping a segment start address and segment physical block offset to a RAID array physical address.

RAID address segment offset mapping 248 is for mapping a RAID array physical address to a drive and logical block address within that drive.

Figure 2C:
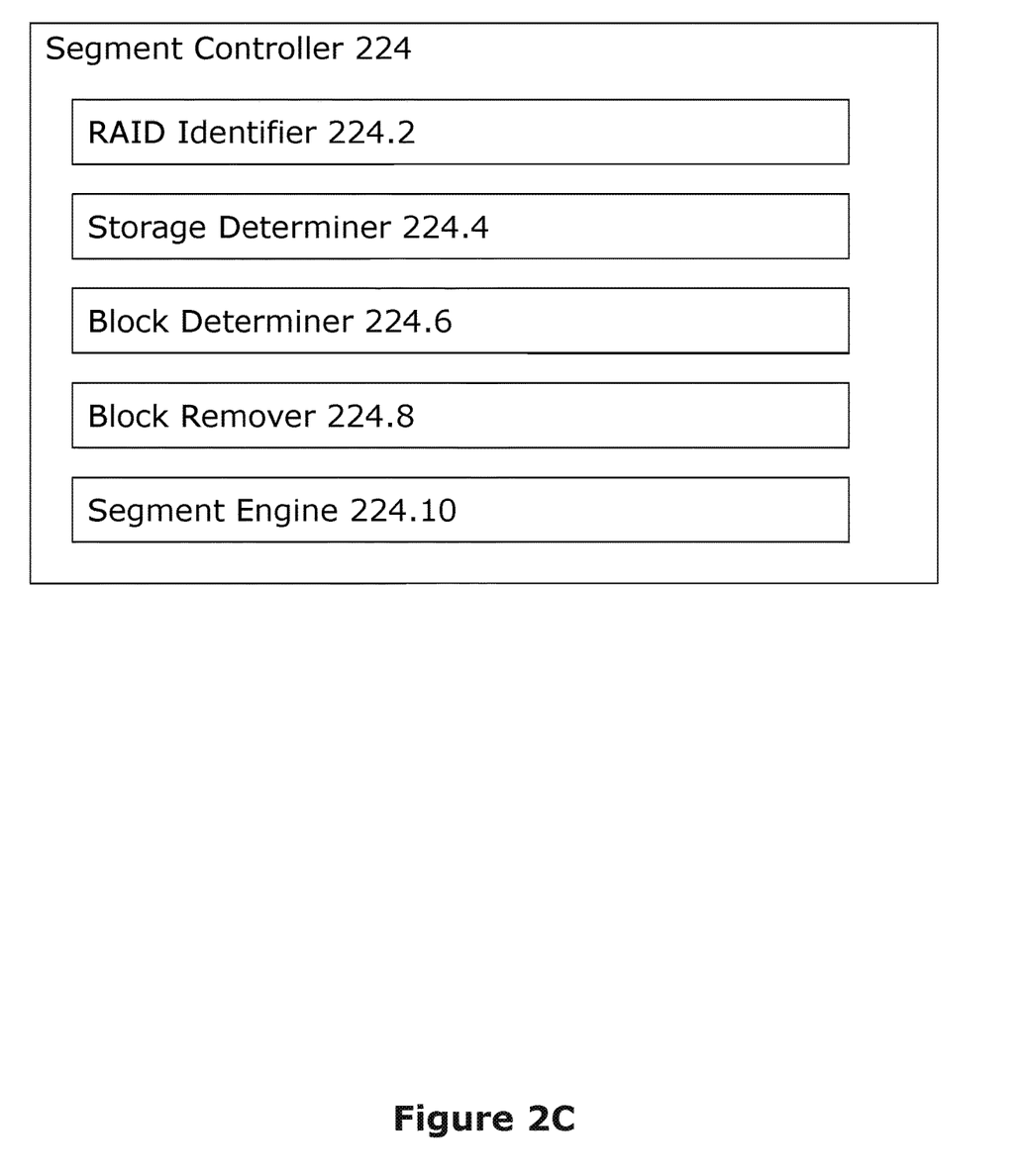
FIG. 2C is a component diagram of a segment controller of the preferred embodiment.

Referring to FIG. 2C, segment controller 224 is described in more detail comprising: RAID identifier 224.2; storage determiner 224.4; block determiner 224.6; block remover 224.8; and segment engine 224.10.

RAID identifier 224.2 is for retrieving RAID characteristics of the volume.

Storage determiner 224.4 is for determining required additional storage.

Block determiner 224.6 is for determining logical blocks to assign based on the retrieved RAID characteristics and the required additional storage.

Block remover 224.8 is for removing determined logical blocks from the group of unassigned logical blocks.

Segment engine 224.10 is for adding determined logical blocks to the segment.

Segment controller 224 works in conjunction with volume RAID controller 226 whereby the volume RAID controller 226 is for configuring determined logical blocks according to the retrieved RAID characteristics.

Figure 2D:
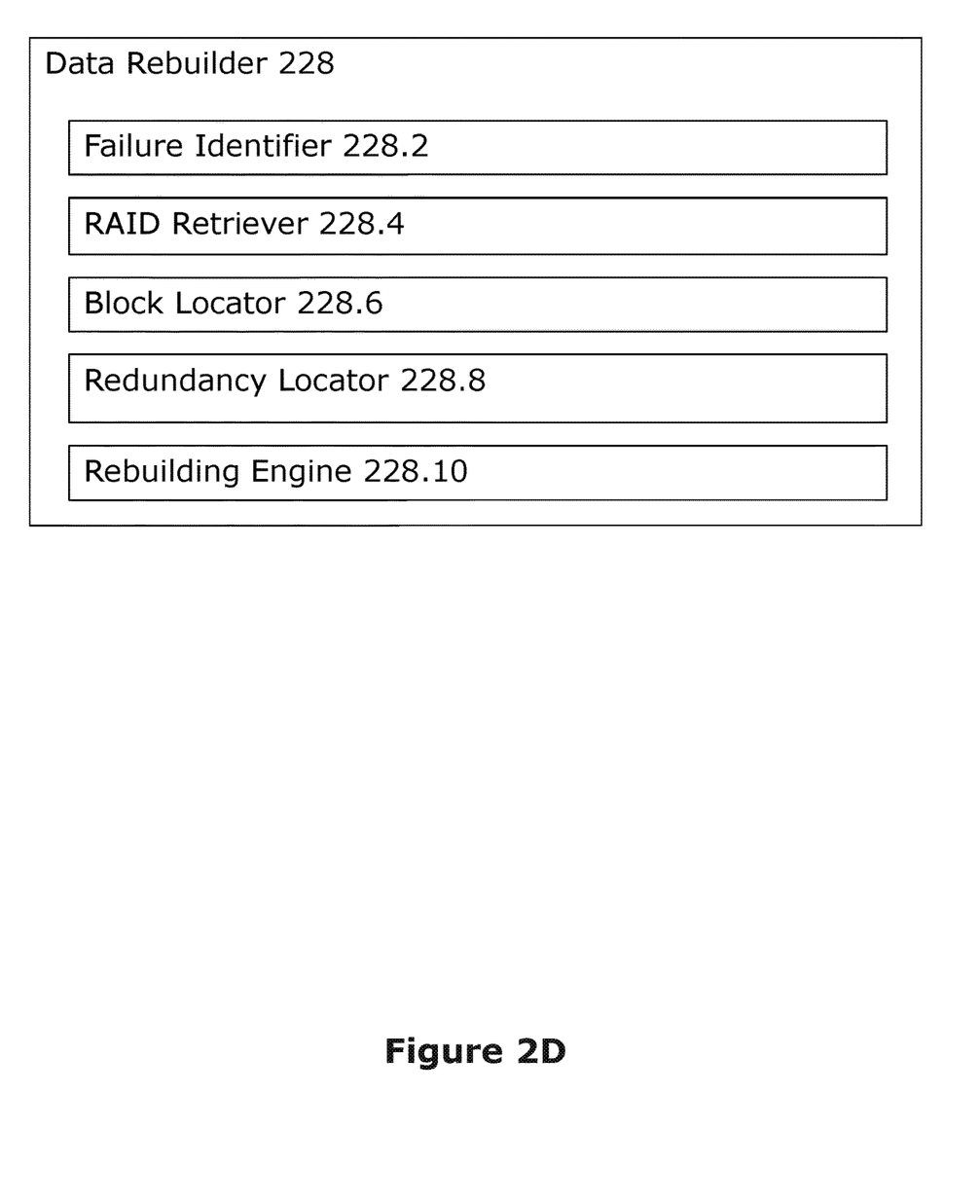
FIG. 2D is a component diagram of a data rebuilder of the preferred embodiment.

Referring to FIG. 2D, data rebuilder 228 is described in more detail comprising: a failure identifier 228.2; a RAID retriever 228.4; a block locator 228.6; a redundancy locator 228.8; and a rebuilding engine 228.10.

Failure identifier 228.2 is for identifying one or more segments with failed logical blocks associated with a failed drive.

RAID retriever 228.4 is for retrieving RAID characteristics of the identified segments.

Block locator 228.6 is for locating spare logical blocks on the identified segments.

Redundancy locator 228.8 is for locating redundant RAID data corresponding to lost data on the failed logical blocks using the retrieved RAID characteristics.

Rebuilding engine 228.10 is for rebuilding lost data on the spare logical blocks from the redundant RAID data.

Figure 3A:
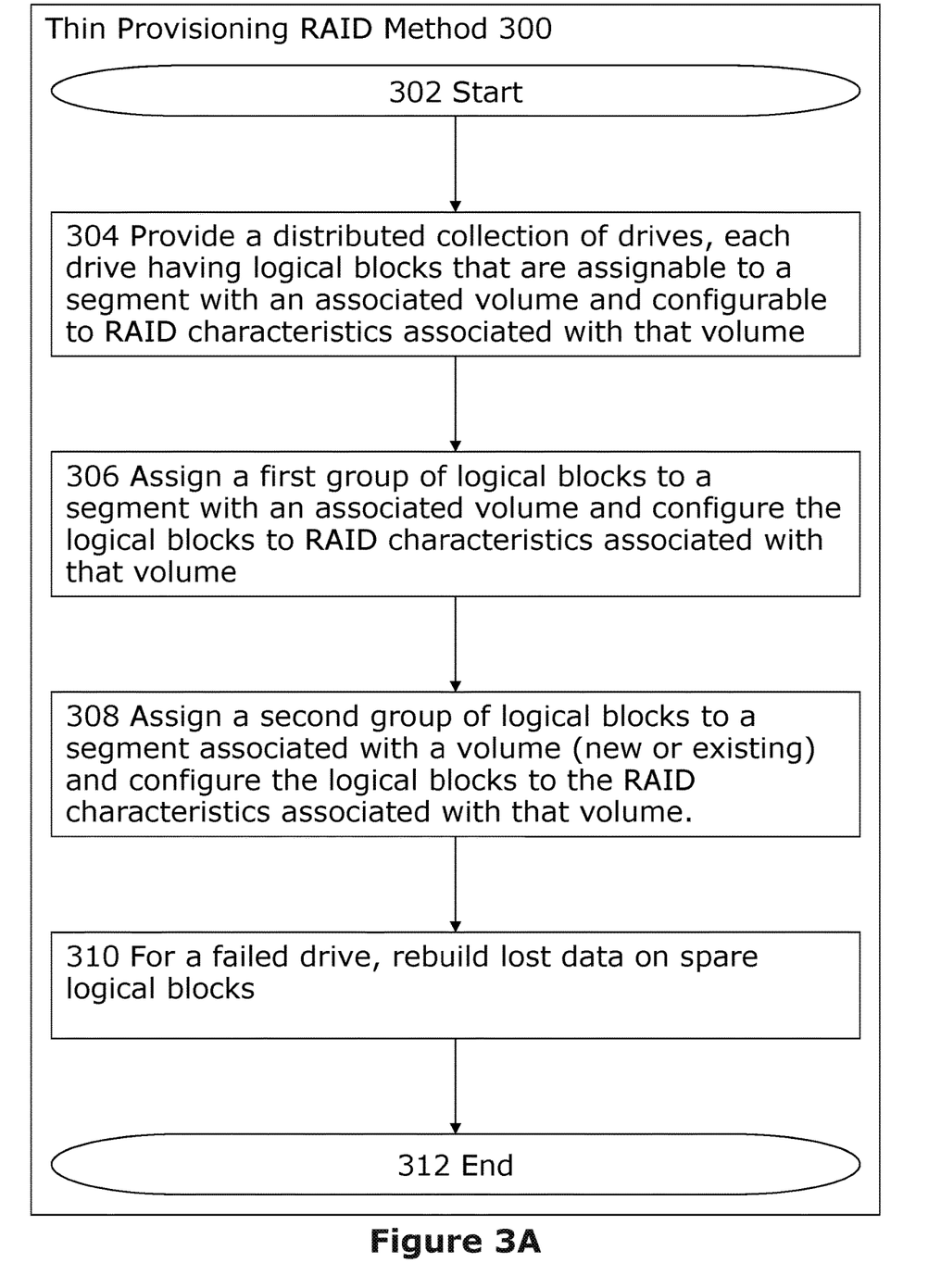
FIG. 3A is a flow diagram of a thin provisioning RAID method of the preferred embodiment.

Referring to FIG. 3A, preferred embodiment thin provisioning RAID method 300 comprises logical process blocks 302 to 312. Although there is an order to the preferred embodiment blocks as described, the blocks may not necessarily need to be in this order unless specified and in other embodiments blocks can be in a different order.

Block 302 is the start of the method when the storage system is initialized.

Block 304 is for providing a distributed collection of drives where each drive has logical blocks and each logical block is assignable to a segment with an associated volume and is configurable to RAID characteristics associated with that volume.

Block 306 is for assigning a first group of logical blocks to a segment with an associated volume and configuring the first group of logical blocks to RAID characteristics associated with that volume. A further group of logical blocks is ready to be assigned to any segment but is not yet assigned. Logical blocks that are ready to be assigned to any segment but are not yet assigned are called free logical blocks.

Block 308 is for assigning a second group of logical blocks to a second segment associated with a volume and configuring the second group of logical blocks to that volume. The volume associated with second segment can be an existing volume or a new volume. Block 308 is described in more detail below with respect to FIG. 3B.

Block 310 is for rebuilding lost data on spare logical blocks for a failed drive. Block 310 is described in more detail below with respect to FIG. 3C.

Block 312 is the end of thin provisioning RAID method 300.

Figure 3B:
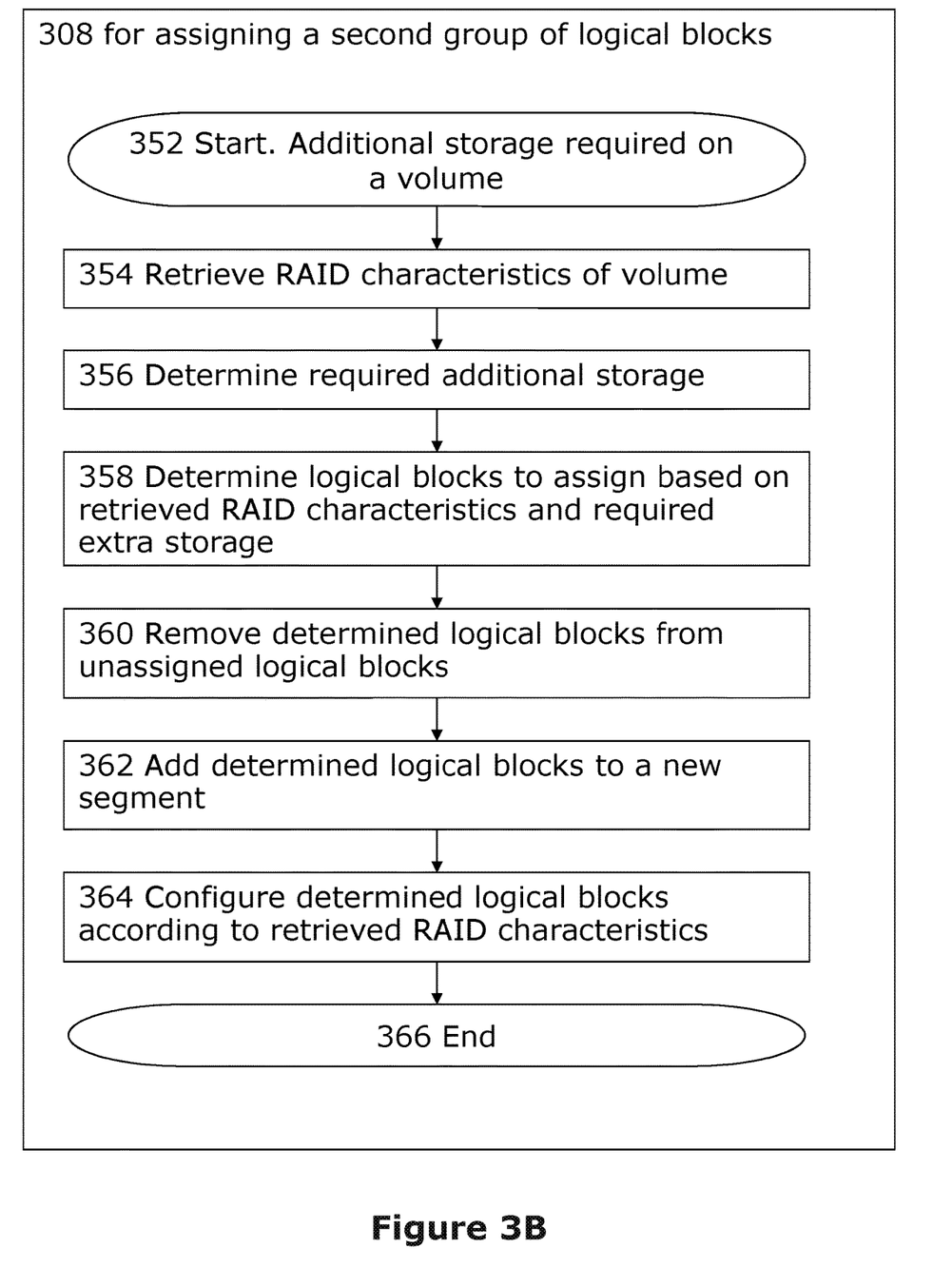
FIG. 3B is a more detailed flow diagram of a logical block assigning process of the thin provisioning RAID method of the preferred embodiment.

Referring to FIG. 3B, block 308 for assigning a second group of logical blocks is described in more detail and comprises logical process subblocks 352 to 366.

Subblock 352 starts when additional storage is required on a volume (a new volume or an existing volume).

Subblock 354 is for retrieving RAID characteristics of the volume.

Subblock 356 is for determining required additional storage.

Subblock 358 is for determining logical blocks to assign based on the retrieved RAID characteristics and the required additional storage.

Subblock 360 is for removing determined logical blocks from the group of unassigned logical blocks.

Subblock 362 is for adding determined logical blocks to a segment.

Subblock 364 is for configuring the determined logical blocks according to the retrieved RAID characteristics.

Subblock 366 is the end of block 308.

Figure 3C:
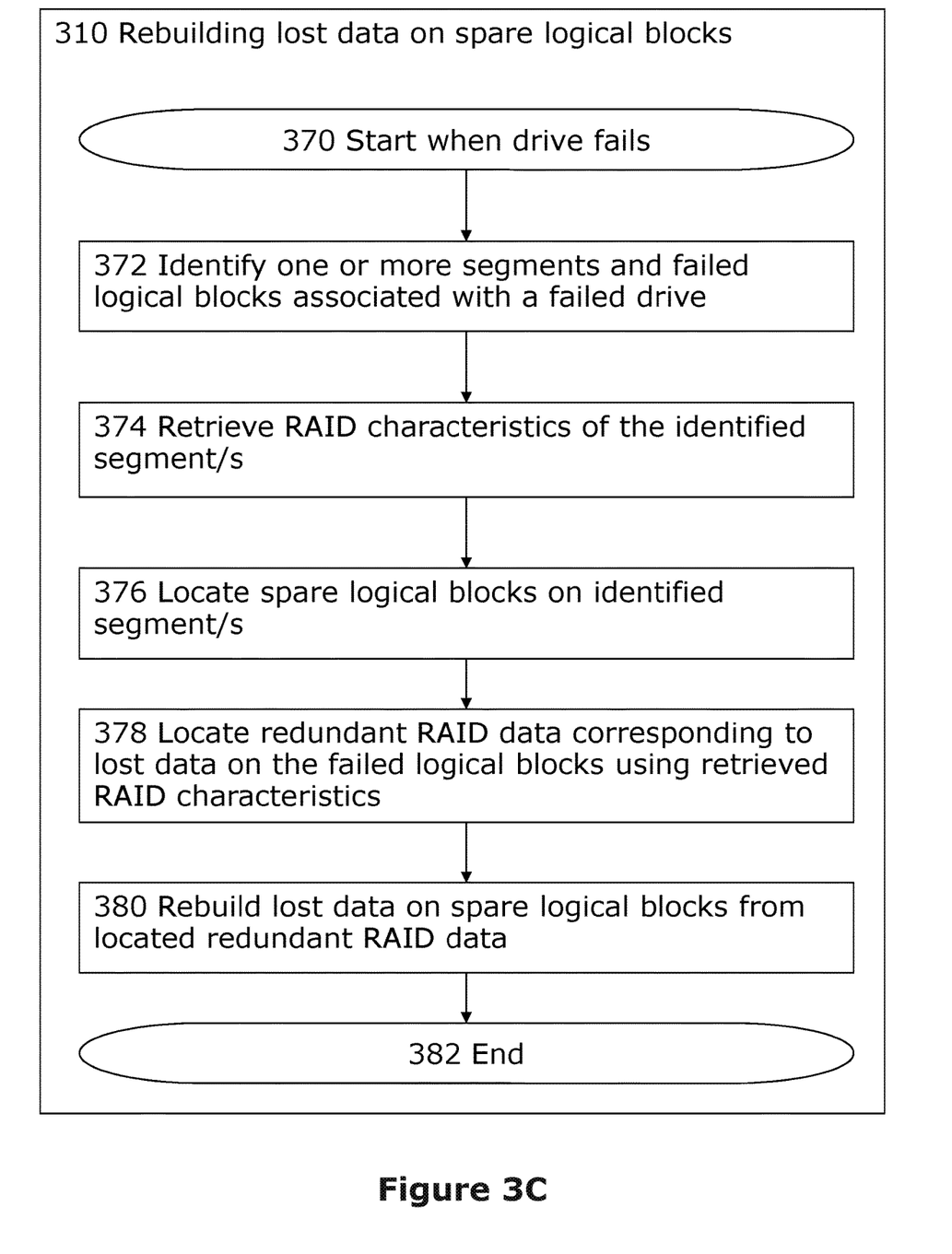
FIG. 3C is a more detailed flow diagram of a data rebuilding process of the thin provisioning RAID method of the preferred embodiment.

Referring to FIG. 3C, block 310 for rebuilding lost data on spare logical blocks comprises logical process subblocks 370 to 382. The method is described with respect to one or more segments that may or may not share RAID characteristics.

Subblock 370 is the start when a drive fails and there are data losses on corresponding logical blocks on one or more segments.

Subblock 372 is for identifying one or more segments and failed logical blocks associated with a failed drive.

Subblock 374 is for retrieving RAID characteristics of the identified one or more segments.

Subblock 376 is for locating spare logical blocks on the identified one or more segments.

Subblock 378 is for locating redundant RAID data corresponding to lost data on the failed logical blocks using the retrieved RAID characteristics.

Subblock 380 is for rebuilding the lost data on spare logical blocks from located redundant RAID data using retrieved RAID characteristics.

Subblock 382 is the end of block 310.

Figure 4A:
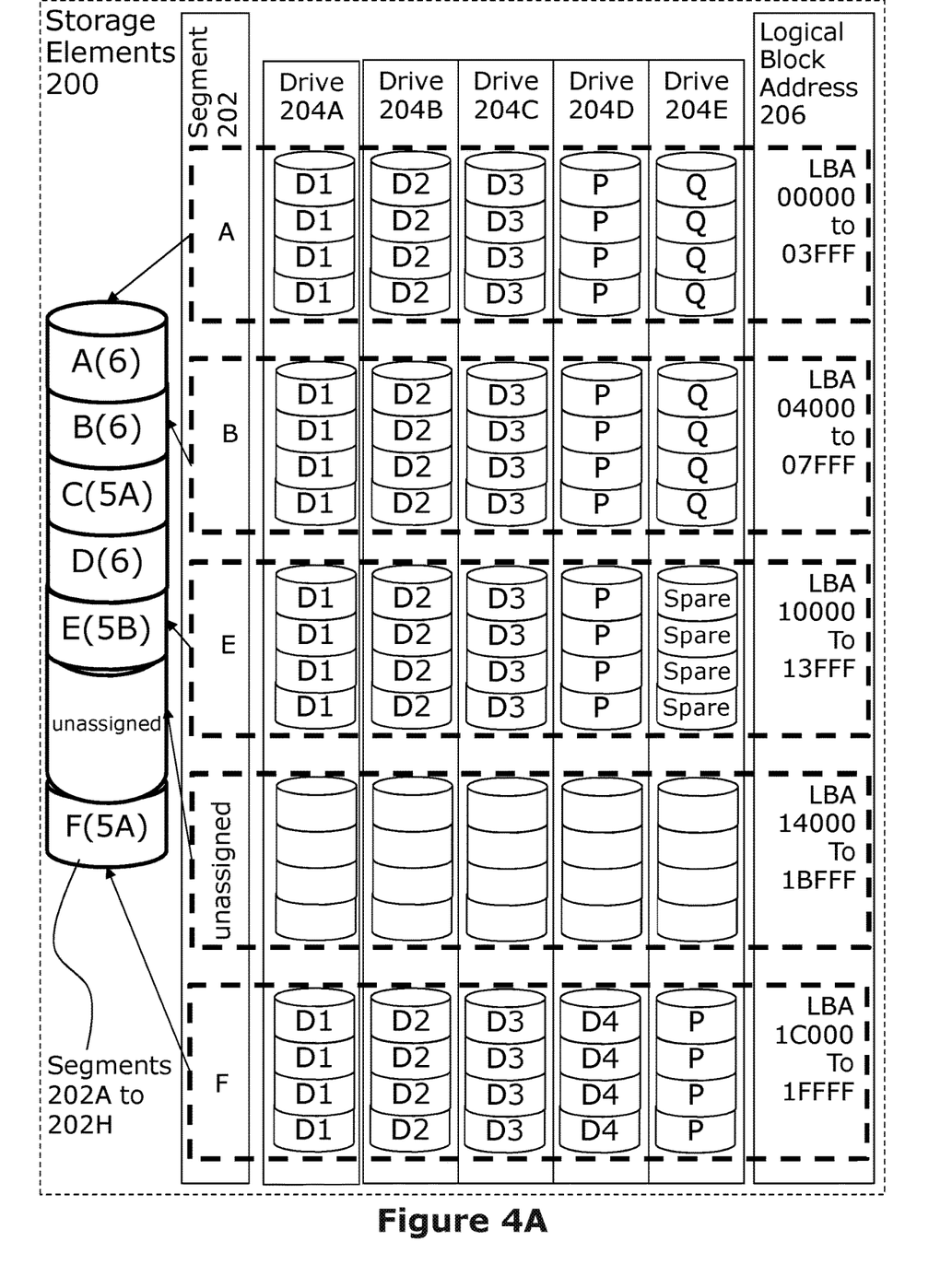
FIG. 4A to 4C are schematic diagrams of an example storage element configuration according to the preferred embodiment.
Figure 4B:
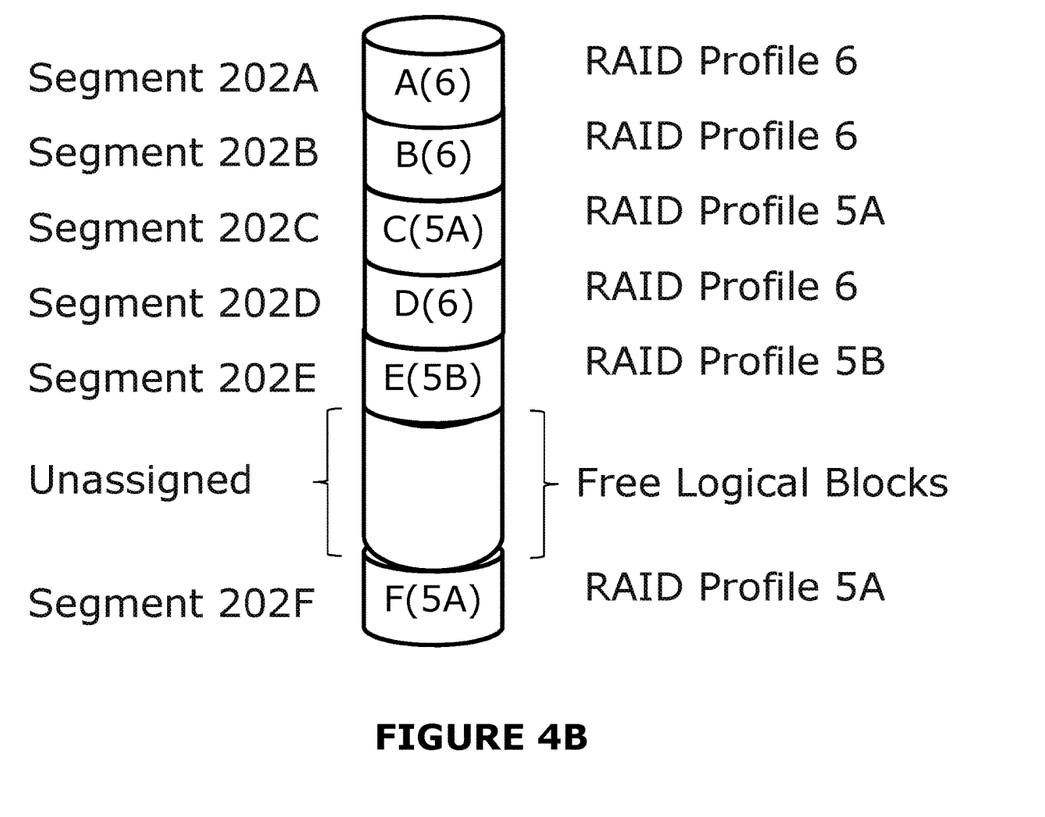
Figure 4C:
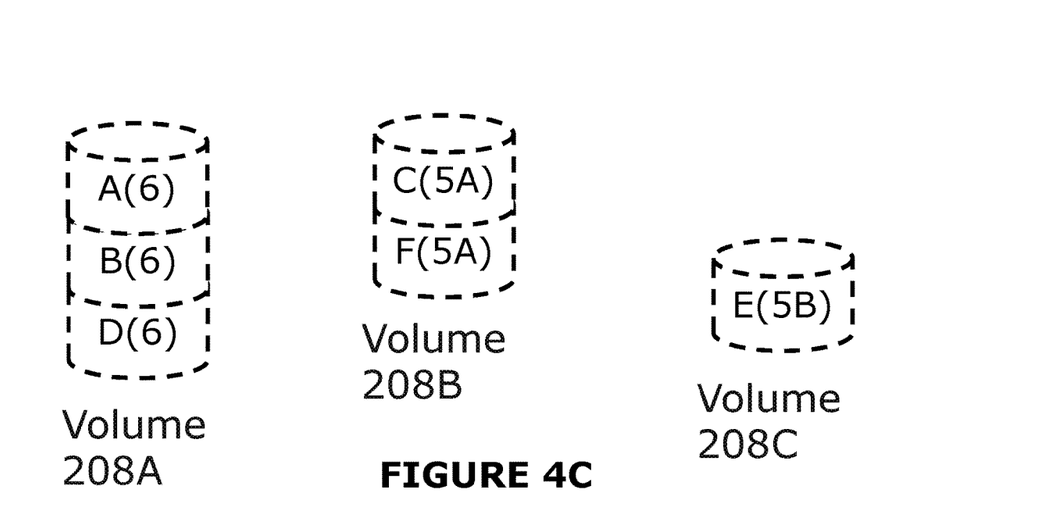

Referring to FIGS. 4A, 4B and 4C there is described an example configuration of storage elements 200 comprising: a distributed collection of drives (Drive 204A to E) (see FIG. 4A), each drive having logical blocks 206 (LBA 0000 to 1FFFF), each logical block being assignable to a segment (202A to 202F) with an associated volume (208A to 208C) (see FIG. 4C) and being configurable to RAID characteristics (see FIG. 4B) associated with that volume (208A to 208C); a group of logical blocks (LBA 00000 to 03FFF) assigned to a segment (202A) with an associated volume (208A) and wherein the logical blocks (LBA 00000 to 03FFF) are configured to RAID characteristics (RAID 6) associated with that volume (208A); and a further group of logical blocks (LBA 14000 to 1BFFF) not yet being assigned to a segment.

Example configuration of storage elements 200 further comprises a second group of logical blocks (LBA 04000 to 07FFF) assigned to a second segment (202B) associated with a volume (208A) and wherein the second group of logical blocks is configured to the existing RAID characteristics (RAID profile 6) associated with that volume (208A).

Example configuration of storage elements 200 further comprising a third group of logical blocks (LBA 10000 to 13FFF) assigned to a third segment (202E) associated with a volume (208C) and wherein the third group of logical blocks is configured to a new RAID characteristic (RAID profile 5B) associated with that volume (208C).

Example configuration of storage elements 200 further comprising a fourth group of logical blocks (LBA 14000 to 1BFFF) illustrated as not assigned or associated to any segments and therefore not associated with a volume. The fourth group of logical blocks are free logical blocks ready to be assigned to a segment and configured to a RAID characteristic associated with a volume.

Example configuration of storage elements 200 further comprising a fifth group of logical blocks (LBA 1C000 to 1FFFF) assigned to a fifth segment (202F) associated with a volume (208B) and wherein the fifth group of logical blocks is configured to a new RAID characteristic (RAID profile 5A) associated with that volume (208B).

The second group of logical blocks (LBA 04000 to 07FFF) is assigned to the second segment (202B) in the following way. The RAID characteristics of the associated volume are retrieved (RAID profile 6 comprising three stripes of logical blocks (D1; D2 and D3) and two parity logical blocks (P and Q)). The number of required extra storage space is determined as twelve logical blocks. The numbers of logical blocks to assign is determined based on the retrieved RAID characteristics (three stripes and two parity logical blocks) and the required extra storage space (twelve logical blocks). For every three logical blocks required, five logical blocks will be assigned because of the two parity logical blocks that are required. Therefore, in this example, twenty logical blocks are to be assigned for the required fifteen twelve logical blocks (if each logical block represents 1 Kilobyte (1 KB) then 20 KB are assigned for the required 15 KB 12 KB). Twenty logical blocks are removed from the group of unassigned logical blocks. Twenty logical blocks are added to segment 202B. Then the twenty logical blocks are configured according to RAID profile 6 and the retrieved RAID characteristics comprise three stripes of logical blocks (D1; D2 and D3) and two parity logical blocks (P and Q). The configured twenty logical blocks are then associated with volume 208A.

Example configuration of storage elements 200 comprises three RAID configurations: RAID profile 6; RAID profile 5A; and RAID profile 5B. RAID profile 6 is this example using three stripes of logical blocks (D1; D2 and D3) and two parity logical blocks (P and Q). RAID profile 5A is this example uses three stripes of logical blocks (D1; D2 and D3); one parity logical block (P); and a spare logical block (for use in rebuilding a failed drive). RAID profile 5B is this example uses four stripes of logical blocks (D1; D2; D3 and D4); and one parity logical block (P) (and no spare). These are only examples and other example can use other RAID profile having others RAID characteristics taken from: stripe width; stripe length; parity characteristics; mirror characteristics and spare count.

Further embodiments of the technology are now described. It will be clear to one of ordinary skill in the art that all or part of the logical process blocks of the preferred embodiment may be alternatively embodied in a logic apparatus, or a plurality of logic apparatus, comprising logic elements arranged to perform the logical process blocks of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the blocks of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present technology may be realized in the form of a computer implemented method of deploying a service comprising blocks of deploying computer program code operable to, when deployed into a computer infrastructure and executed thereon, cause the computer system to perform all the blocks of the method.

It will be appreciated that the method and components of the preferred embodiment may alternatively be embodied fully or partially in a parallel computing system comprising two or more processors for executing parallel software.

A further embodiment of the technology is a computer program product defined in terms of a system and method. The computer program product may include a computer-readable storage medium (or media) having computer-readable program instructions thereon for causing a processor to carry out aspects of the present technology.

The computer-readable storage medium can be a tangible device that can retain and store instructions for use by an instruction execution device.

The present technology may be a system, a method, and/or a computer program product. The computer program product may include a computer readable storage medium (or media) having computer readable program instructions thereon for causing a processor to carry out aspects of the present technology.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital video disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technology.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable 9 data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded on to a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present technology.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

The invention claimed is:

1. A system, comprising:
   a first set of logical blocks assigned to a first segment that is associated with a first volume, the first set of logical blocks including a first RAID characteristic associated with the first volume upon assignment to the first segment;
   a second set of logical blocks assigned to a second segment that is associated with a second volume, the second set of logical blocks including a second RAID characteristic associated with the second volume upon assignment to the second segment; and
   a third set of free logical blocks assigned to a third free segment, each free logical block in the third set of free logical blocks is assignable to one of the first segment of the first volume and the second segment of the second volume,
   wherein:
      the third free segment is unassociated with any volume and is unassigned any RAID characteristic,
      each free logical block of the third set of free logical blocks is a free logical block that is initially unassigned any RAID characteristic, is initially unassigned to the one of the first segment and the second segment, and is available for subsequent assignment to the one of the first segment and the second segment,
      a first quantity of free logical blocks of the third set of free logical blocks that is assigned to the first segment is based a first quantity of logical blocks utilized in implementing the first RAID characteristic,
      a second quantity of free logical blocks of the third set of free logical blocks that is assigned to the second segment is based a second quantity of logical blocks utilized in implementing the second RAID characteristic,
      each free logical block of the first quantity of free logical blocks of the third set of free logical blocks that is subsequently assigned to the first segment is configured to include the same first RAID characteristic as each of the first quantity of logical blocks included in the first set of logical blocks assigned to the first segment associated with the first volume, and
      each free logical block of the second quantity of free logical blocks of the third set of free logical blocks that is subsequently assigned to the second segment is configured to include the same second RAID characteristic as each of the second quantity of logical blocks included in the second set of logical blocks assigned to the second segment associated with the second volume.

2. The system of claim 1, wherein the first RAID characteristic and the second RAID characteristic are different RAID characteristics.

3. The system of claim 1, wherein:
the first RAID characteristic includes one of:
a stripe width,
a stripe length,
parity segments,
mirror segments, and
spare segments; and
the second RAID characteristic includes a different one of:
the stripe width,
the stripe length,
the parity segments,
the mirror segments, and
the spare segments.

4. The system of claim 1, wherein the first and second RAID characteristics include one of:
a stripe width;
a stripe length;
parity segments;
mirror segments; and
spare segments.

5. The system of claim 1, wherein:
the first RAID characteristic includes one of an existing RAID characteristic and a new RAID characteristic; and
the second RAID characteristic includes one of the existing RAID characteristic and the new RAID characteristic.

6. The system of claim 1, wherein the second volume is one of an existing volume and a new volume.

7. The system of claim 1, further comprising a volume controller including:
a RAID identifier for retrieving RAID characteristics of each volume;
a storage determiner for determining required additional storage;
a block determiner for determining assignable free logical blocks of the third set of free logical blocks to assign based on the retrieved RAID characteristics and the required additional storage;
a block remover for removing determined free logical blocks of the third set of free logical blocks from the third set of free logical blocks; and
a segment engine for adding determined free logical blocks of the third set of free logical blocks to the first segment or the second segment,
wherein the volume controller is for configuring determined free logical blocks of the third set of free logical blocks according to the retrieved RAID characteristics.

8. The system of claim 7, further comprising:
a data rebuilder, wherein the data rebuilder comprises:
a failure identifier for identifying one or more segments with failed logical blocks associated with a failed drive,
a RAID retriever for retrieving RAID characteristics of the identified segments,
a block locator for locating spare logical blocks on the identified segments,
a redundancy locator for locating redundant RAID data corresponding to lost data on the failed logical blocks using the retrieved RAID characteristics, and
a rebuilding engine for rebuilding lost data on the spare logical blocks from the redundant RAID data.

9. A method, comprising:
assigning a first set of logical blocks to a first segment that is associated with a first volume, the first set of logical blocks including a first RAID characteristic associated with the first volume upon assignment to the first segment;
assigning a second set of logical blocks to a second segment that is associated with a second volume, the second set of logical blocks including a second RAID characteristic associated with the second volume upon assignment to the second segment; and
assigning a third set of free logical blocks to be assignable to a third free segment, each free logical block in the third set of free logical blocks is assignable to one of the first segment of the first volume and the second segment of the second volume,
wherein:
the third free segment is unassociated with any volume and is unassigned any RAID characteristic,
each free logical block of the third set of free logical blocks is a free logical block that is initially unassigned any RAID characteristic, is initially unassigned to the one of the first segment and the second segment, and is available for subsequent assignment to the one of the first segment and the second segment,
a first quantity of free logical blocks of the third set of free logical blocks that is assigned to the first segment is based a first quantity of logical blocks utilized in implementing the first RAID characteristic,
a second quantity of free logical blocks of the third set of free logical blocks that is assigned to the second segment is based a second quantity of logical blocks utilized in implementing the second RAID characteristic,
each free logical block of the first quantity of free logical blocks of the third set of free logical blocks that is subsequently assigned to the first segment is configured to include the same first RAID characteristic as each of the first quantity of logical blocks included in the first set of logical blocks assigned to the first segment associated with the first volume, and
each free logical block of the second quantity of free logical blocks of the third set of free logical blocks that is subsequently assigned to the second segment is configured to include the same second RAID characteristic as each of the second quantity of logical blocks included in the second set of logical blocks assigned to the second segment associated with the second volume.

10. The method of claim 9, wherein configuring assigning the third set of free logical blocks comprises configuring one of:
one or more existing free logical blocks in the third set of free logical blocks to be assignable to the one of the first segment and the second segment; and
one or more new free logical blocks in the third set of free logical blocks to be assignable to the one of the first segment and the second segment.

11. The method of claim 9, further comprising:
assigning the second quantity of free logical blocks of the third set of free logical blocks to the second segment, wherein assigning the second quantity of free logical blocks of the third set of free logical blocks to the second segment comprises:
retrieving the second RAID characteristic of the second volume,
determining a required amount additional storage in the second volume,
determining the second quantity of free logical blocks in the third set of free logical blocks to assign to the second segment based on the retrieved second RAID characteristic of the second volume and the required amount of additional storage,
removing the determined second quantity of free logical blocks in the third set of free logical blocks from the third set of free logical blocks,
adding the determined second quantity of free logical blocks in the third set of free logical blocks to the second segment, and
configuring the determined second quantity of free logical blocks in the third set of free logical blocks according to the retrieved second RAID characteristic of the second volume.

12. The method of claim 9, further comprising:
identifying one or more volumes with failed logical blocks associated with a failed drive;
retrieving RAID characteristics of each identified volume;
locating spare logical blocks on each identified volume;
locating redundant RAID data corresponding to lost data on the failed logical blocks using retrieved RAID characteristics; and
rebuilding lost data on the spare logical blocks from the located redundant RAID data.

13. The method of claim 9, wherein the first and second RAID characteristics comprise one of:
a stripe width;
a stripe length;
parity segments;
mirror segments; and
spare segments.

14. The method of claim 9, wherein:
the first RAID characteristic includes one of:
a stripe width,
a stripe length,
parity segments,
mirror segments, and
spare segments; and
the second RAID characteristic includes a different one of:
the stripe width,
the stripe length,
the parity segments,
the mirror segments, and
the spare segments.

15. A computer program product comprising a computer readable storage medium including program instructions embodied therewith, the program instructions executable by a processor to cause the processor to:
assign a first set of logical blocks to a first segment that is associated with a first volume, the first set of logical blocks including a first RAID characteristic associated with the first volume upon assignment to the first segment;
assign a second set of logical blocks assigned to a second segment that is associated with a second volume, the second set of logical blocks including a second RAID characteristic associated with the second volume upon assignment to the second segment; and
assign a third set of free logical blocks to a third free segment, each free logical block in the third set of free logical blocks is assignable to one of the first segment of the first volume and the second segment of the second volume,
wherein:
the third free segment is unassociated with any volume and is unassigned any RAID characteristic,
each free logical block of the third set of free logical blocks is a free logical block that is initially unassigned any RAID characteristic, is initially unassigned to the one of the first segment and the second segment, and is available for subsequent assignment to the one of the first segment and the second segment,
a first quantity of free logical blocks of the third set of free logical blocks that is assigned to the first segment is based a first quantity of logical blocks utilized in implementing the first RAID characteristic,
a second quantity of free logical blocks of the third set of free logical blocks that is assigned to the second segment is based a second quantity of logical blocks utilized in implementing the second RAID characteristic,
each free logical block of the first quantity of free logical blocks of the third set of free logical blocks that is subsequently assigned to the first segment is configured to include the same first RAID characteristic as each of the first quantity of logical blocks included in the first set of logical blocks assigned to the first segment associated with the first volume, and
each free logical block of the second quantity of free logical blocks of the third set of free logical blocks that is subsequently assigned to the second segment is configured to include the same second RAID characteristic as each of the second quantity of logical blocks included in the second set of logical blocks assigned to the second segment associated with the second volume.

16. The computer program product of claim 15, wherein assigning the third set of free logical blocks comprises configuring one of: one or more existing free logical blocks in the third set of free logical blocks to be assignable to the one of the first segment and the second segment; and one or more new free logical blocks in the third set of free logical blocks to be assignable to the one of the first segment and the second segment.

17. The computer program product of claim 16, wherein:
the processor is further configured to assign the second quantity of free logical blocks of the third set of free logical blocks to the second segment; and
assigning the second quantity of free logical blocks of the third set of free logical blocks to the second segment comprises:
retrieving the second RAID characteristic of the second volume,
determining a required amount of additional storage in the second volume,
determining the second quantity of free logical blocks in the third set of free logical blocks to assign to the second segment based on the retrieved second RAID characteristic of the second volume and the required amount of additional storage,
removing the determined the second quantity of free logical blocks in the third set of free logical blocks from the third set of free logical blocks,
adding the determined the second quantity of free logical blocks in the third set of free logical blocks to the second segment, and configuring the determined the second quantity of free logical blocks in the third set of free logical blocks according to the retrieved second RAID characteristic of the second volume.

18. The computer program product of claim 15, wherein the processor is further configured to:
   identify one or more volumes with failed logical blocks associated with a failed drive;
   retrieve RAID characteristics of each identified volume;
   locate spare logical blocks on each identified volume;
   locate redundant RAID data corresponding to lost data on the failed logical blocks using retrieved RAID characteristics; and
   rebuild lost data on the spare logical blocks from the located redundant RAID data.

19. The computer program product of claim 15, wherein the first and second RAID characteristics each comprise one of:
   a stripe width;
   a stripe length;
   parity segments;
   mirror segments; and
   spare segments.

20. The computer program product of claim 9, wherein:
   the first RAID characteristic includes one of:
      a stripe width,
      a stripe length,
      parity segments,
      mirror segments, and
      spare segments; and
   the second RAID characteristic includes a different one of:
      the stripe width,
      the stripe length,
      the parity segments,
      the mirror segments, and
      the spare segments.

* * * * *